US 8,028,433 B1
Oct. 4, 2011

(12) United States Patent
Holland

(54) METHOD AND DEVICE FOR MEASURING THE INCLINATION OF A ROADWAY

(76) Inventor: Carl A. Holland, Lugoff, SC (US)

( * ) Notice: Subject to any disclaimer, the term of this patent is extended or adjusted under 35 U.S.C. 154(b) by 0 days.

(21) Appl. No.: 13/075,715

(22) Filed: Mar. 30, 2011

Related U.S. Application Data

(60) Provisional application No. 61/393,031, filed on Oct. 14, 2010.

(51) Int. Cl.
E01C 23/01 (2006.01)
(52) U.S. Cl. ............................................. 33/521; 33/1 H
(58) Field of Classification Search .................. 33/1 H, 33/301, 366.11, 521; 116/DIG. 16
See application file for complete search history.

(56) References Cited

U.S. PATENT DOCUMENTS

| 169,290 | A | | 10/1875 | Ralf | |
|---|---|---|---|---|---|
| 931,973 | A | | 8/1909 | Tolley et al. | |
| 944,462 | A | * | 12/1909 | Osborne, Jr. | 33/521 |
| 953,490 | A | | 3/1910 | Roughen | |
| 1,074,367 | A | | 9/1913 | Keefauver | |
| 1,076,797 | A | | 10/1913 | Sutton | |
| 1,141,471 | A | | 6/1915 | McClure | |
| 1,264,484 | A | | 4/1918 | Bridgman | |
| 2,538,145 | A | | 1/1951 | Christopulos | |
| 2,841,881 | A | | 7/1958 | Baldwin | |
| 3,222,787 | A | | 12/1965 | Young | |
| 3,295,209 | A | | 1/1967 | Young | |
| 3,564,531 | A | * | 2/1971 | Burgin | 33/366.11 |
| 3,751,818 | A | | 8/1973 | Eller, Jr. | |
| 4,069,592 | A | | 1/1978 | Hosac | |
| 4,244,117 | A | | 1/1981 | Cantarella et al. | |
| 4,467,527 | A | | 8/1984 | North et al. | |
| 4,596,293 | A | | 6/1986 | Wallussek et al. | |
| 4,635,414 | A | | 1/1987 | Allen | |
| 4,697,352 | A | | 10/1987 | Angove | |
| 4,754,553 | A | | 7/1988 | Simpson | |
| 4,970,800 | A | * | 11/1990 | Takizawa et al. | 33/521 |
| 5,036,594 | A | | 8/1991 | Kesler et al. | |
| 5,068,970 | A | | 12/1991 | Kunze | |
| 5,187,977 | A | * | 2/1993 | Koschorek et al. | 33/521 |
| 5,191,713 | A | | 3/1993 | Alger | |
| 5,694,697 | A | | 12/1997 | Curtis | |
| 5,745,225 | A | | 4/1998 | Watanabe et al. | |
| 5,799,403 | A | | 9/1998 | Schrum | |
| 5,859,783 | A | | 1/1999 | Ytterberg | |
| 6,119,353 | A | * | 9/2000 | Grønskov | 33/521 |
| 6,161,429 | A | | 12/2000 | Marvel | |
| 6,470,251 | B1 | | 10/2002 | Enix | |
| 6,510,615 | B1 | | 1/2003 | Budd | |
| 7,257,903 | B2 | | 8/2007 | Lee | |

(Continued)

OTHER PUBLICATIONS

Wyler AG 2010 Catalog, [online], pp. 56-59, [retrieved on Mar. 29, 2011]. Retrieved from <URL: http://www.wylerag.com/pdf_katalog_2010/CLINO_PLUS_p56-59.pdf.

Primary Examiner — Brad Bennett
(74) Attorney, Agent, or Firm — Samuel Alexander Long, Jr.

(57) ABSTRACT

The invention is a method and device for measuring the inclination of a roadway using highly precise digital inclinometer and a frame for holding and suspending the digital inclinometer over the width of a lane of traffic. The device and method require a single, and only a single, human operator. The device is lightweight and highly portable.

16 Claims, 7 Drawing Sheets

U.S. PATENT DOCUMENTS

| | | |
|---|---|---|
| 7,491,011 B2 | 2/2009 | Quenzi |
| 7,530,174 B1 | 5/2009 | Kimball et al. |
| 7,559,718 B2 | 7/2009 | Zachman et al. |
| 7,591,190 B2 | 9/2009 | Asher |
| 2008/0263881 A1* | 10/2008 | Basham .......................... 33/521 |
| 2010/0050449 A1* | 3/2010 | Ilton ............................... 33/301 |

* cited by examiner

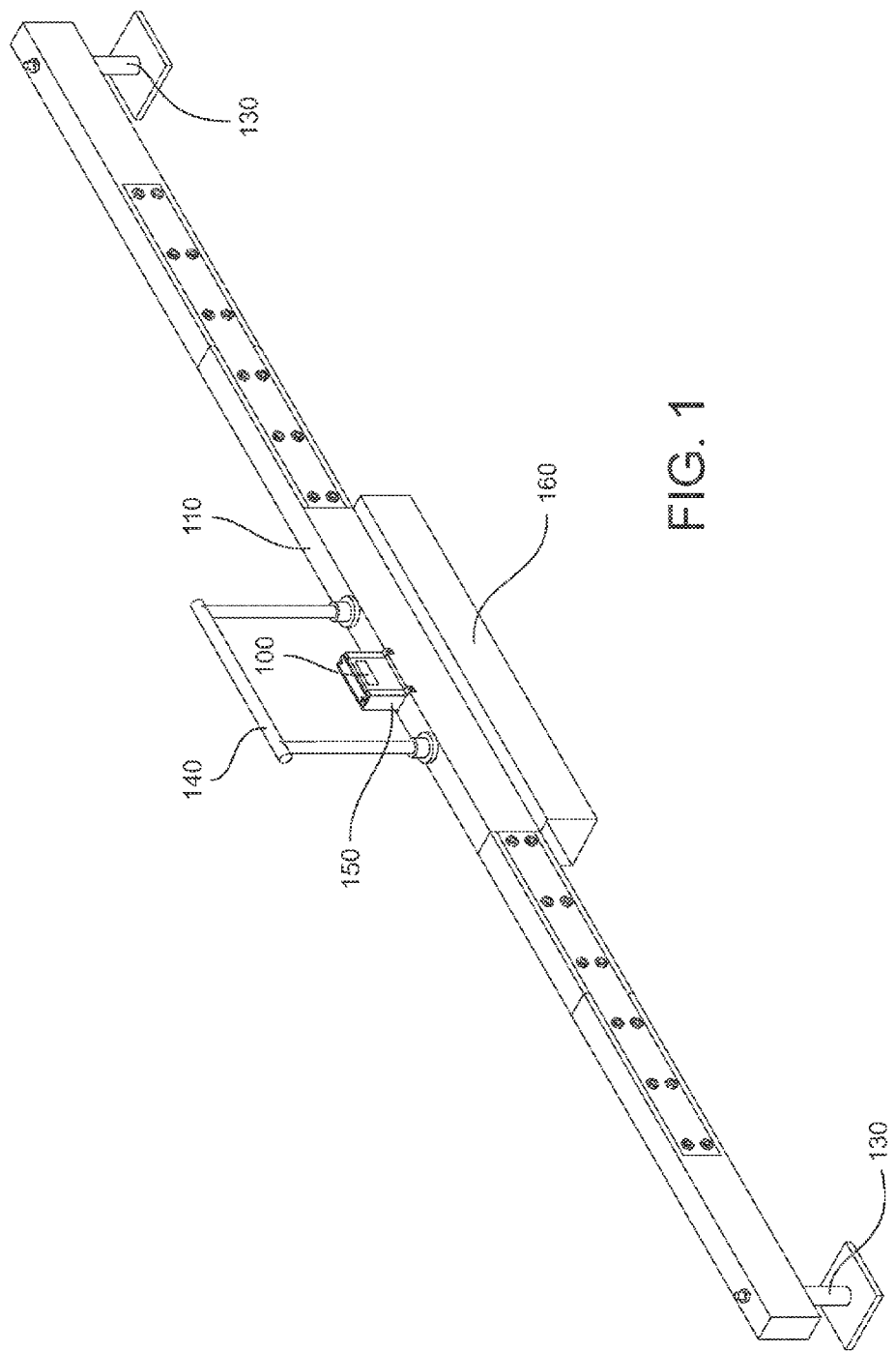

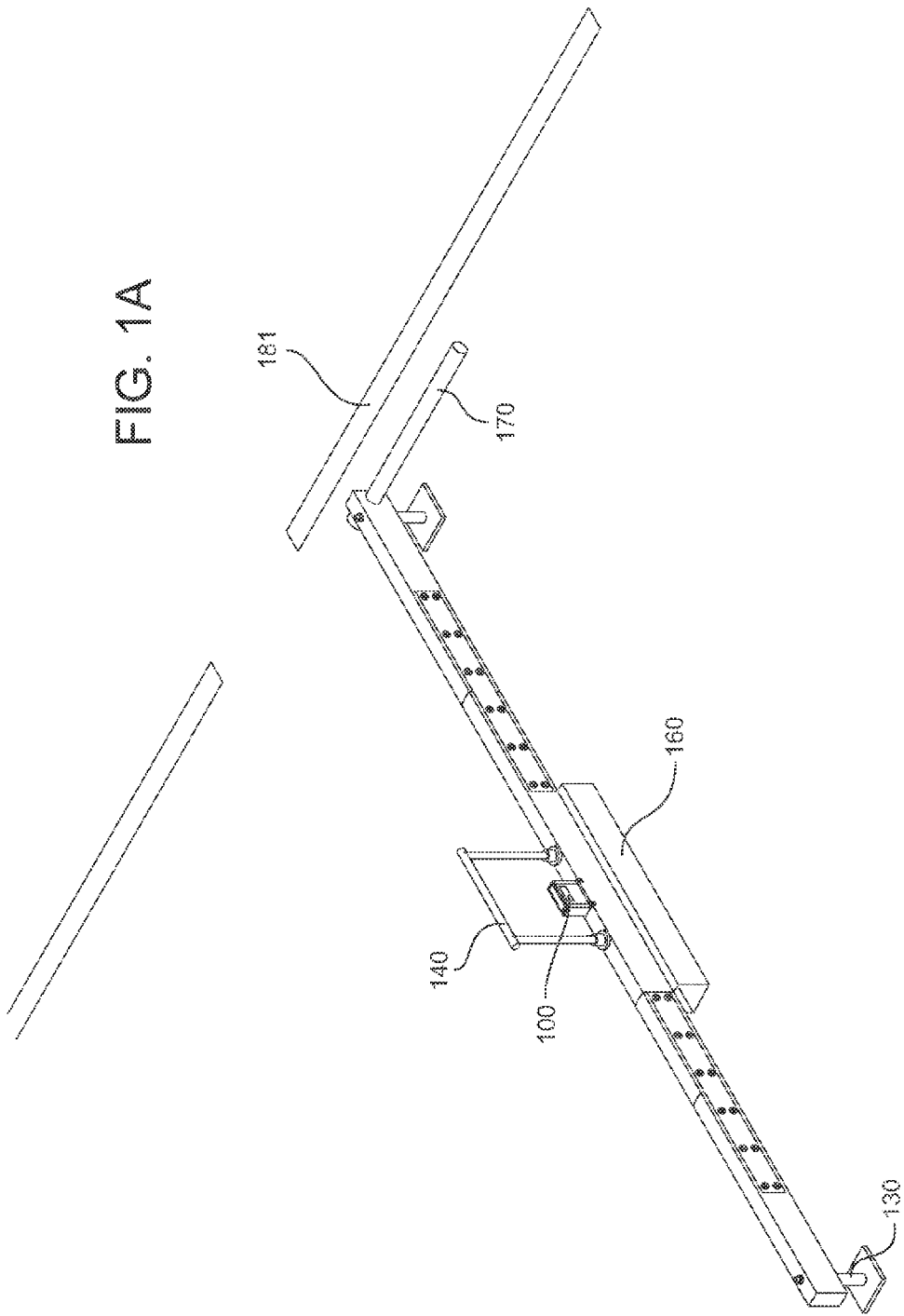

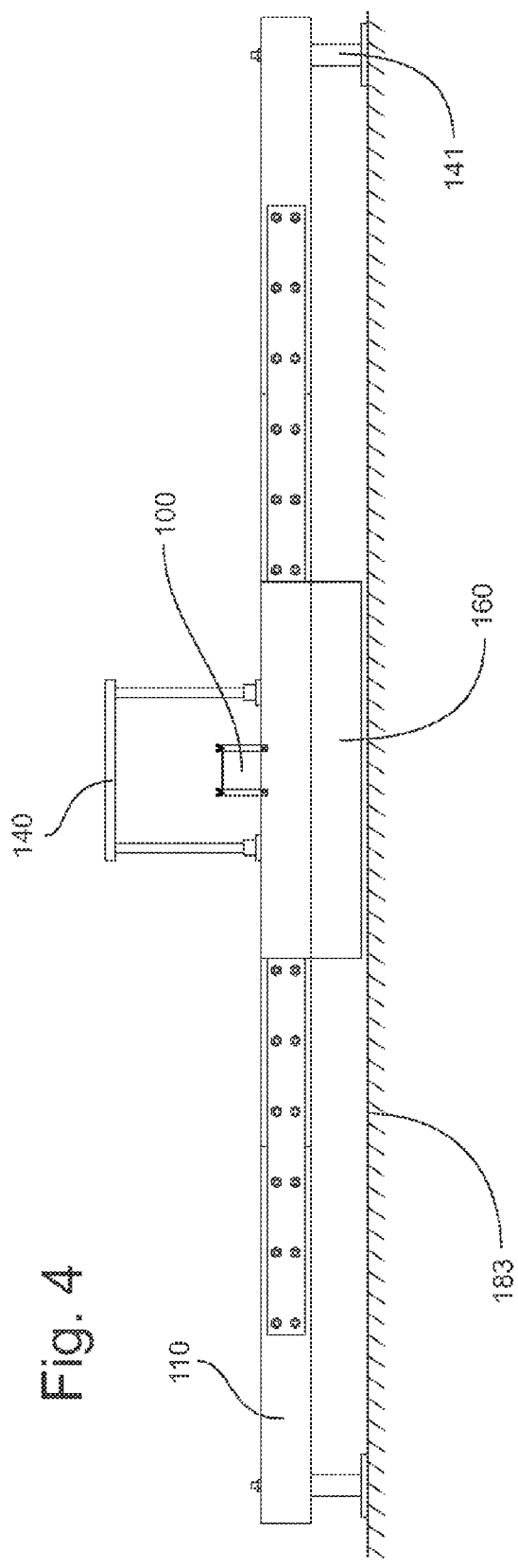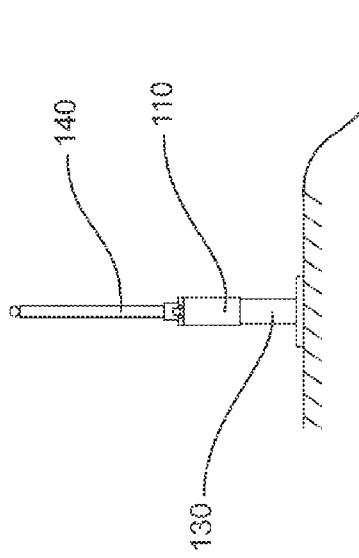

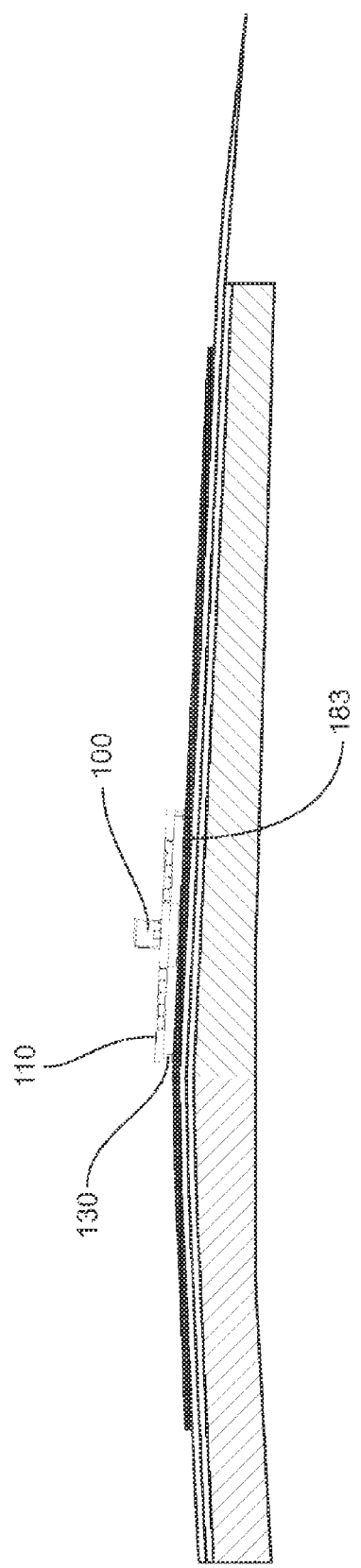

METHOD AND DEVICE FOR MEASURING THE INCLINATION OF A ROADWAY

RELATED APPLICATIONS

This application claims priority from U.S. Provisional Patent Application having Ser. No. 61/393,031 filed on Oct. 14, 2010.

FEDERALLY SPONSORED RESEARCH OR DEVELOPMENT

Not applicable

REFERENCED OR INCORPORATED MATERIAL

Not applicable.

FIELD OF INVENTION

The present invention relates to the field of roadway construction. More specifically, it relates to a device and a method for measuring the inclination of the road, relative to the perpendicular side of the road, using a precise measuring tool and a precision frame for holding the tool.

BACKGROUND OF THE INVENTION

Typically, a roadway course will have a slope or a crown extending downwards from the center of the road towards the sides of the road. In the field of roadway construction, the slope of a roadway course perpendicular to the side of the road is of great importance as it allows water, debris, and other hindrances to roadway traffic to exit the road. Too much slope, however, can also pose a roadway hazard. Such hazards are amplified when the subject roadway receives heavy and/or fast traffic such as a United States Interstate Highway. As a result, Engineers have determined very precise slope mandates which determine best practice in roadway design and installation. Both construction codes and paving contracts include these roadway inclination design mandates and it is incumbent upon contractors to insure that their roads meet the precise specified slopes. Likewise, it is incumbent upon roadway owners, such as states and local governments, to insure that they are receiving the precision engineered, sloped roadways for which they are paying.

Typically, slope has been measured and checked using traditional surveying methods. These methods include using several humans to hold and position levels and poles and then to calculate the slope based on observed readings. These methods are labor intensive and take time to perform calculations respective of the slope. Other methods include using imprecise inclinometers mounted on the rear of a roadway paving or screeding machines to capture a reading as the road is constructed.

The present invention provides a method and device for measuring the slope of the roadway with a high degree of precision. The device and method also reduces requisite labor to a single human and eliminates the need for complex calculations. The device is thus an apparatus which may easily be operated and maneuvered by a single person whereby the reading of the slope to a high degree of precision is easily accomplished.

It is a further object of the present invention to provide a device that may be easily transported from jobsite to jobsite. It is still a further object of the present invention to optionally, and alternatively, provide a device that will measure a full lane of traffic but also measure a smaller portion of a lane.

To this end, the present invention contemplates a digital inclinometer that precisely measures slope across a roadway with an error of less than 2.0 arcminutes. This digital inclinometer is fixed in a lightweight, rigid frame designed to span at least the width of a lane of traffic. The frame can be easily moved by a single person and can be disassembled and transported. It may also be, optionally and alternatively, shortened as necessary to span smaller distances.

BRIEF DESCRIPTION OF THE SEVERAL VIEWS OF THE DRAWINGS

FIG. 1 is a perspective view of the assembled device.

FIG. 1A is a perspective view showing the perpendicular alignment bar attached to the assembled device next to the side of the road.

FIG. 4 is a front elevation view of the device.

FIG. 5 is a side elevation view of the device

FIG. 6 is a front elevation view showing the device positioned on a roadway cutaway.

DETAILED DESCRIPTION

Figure 2:
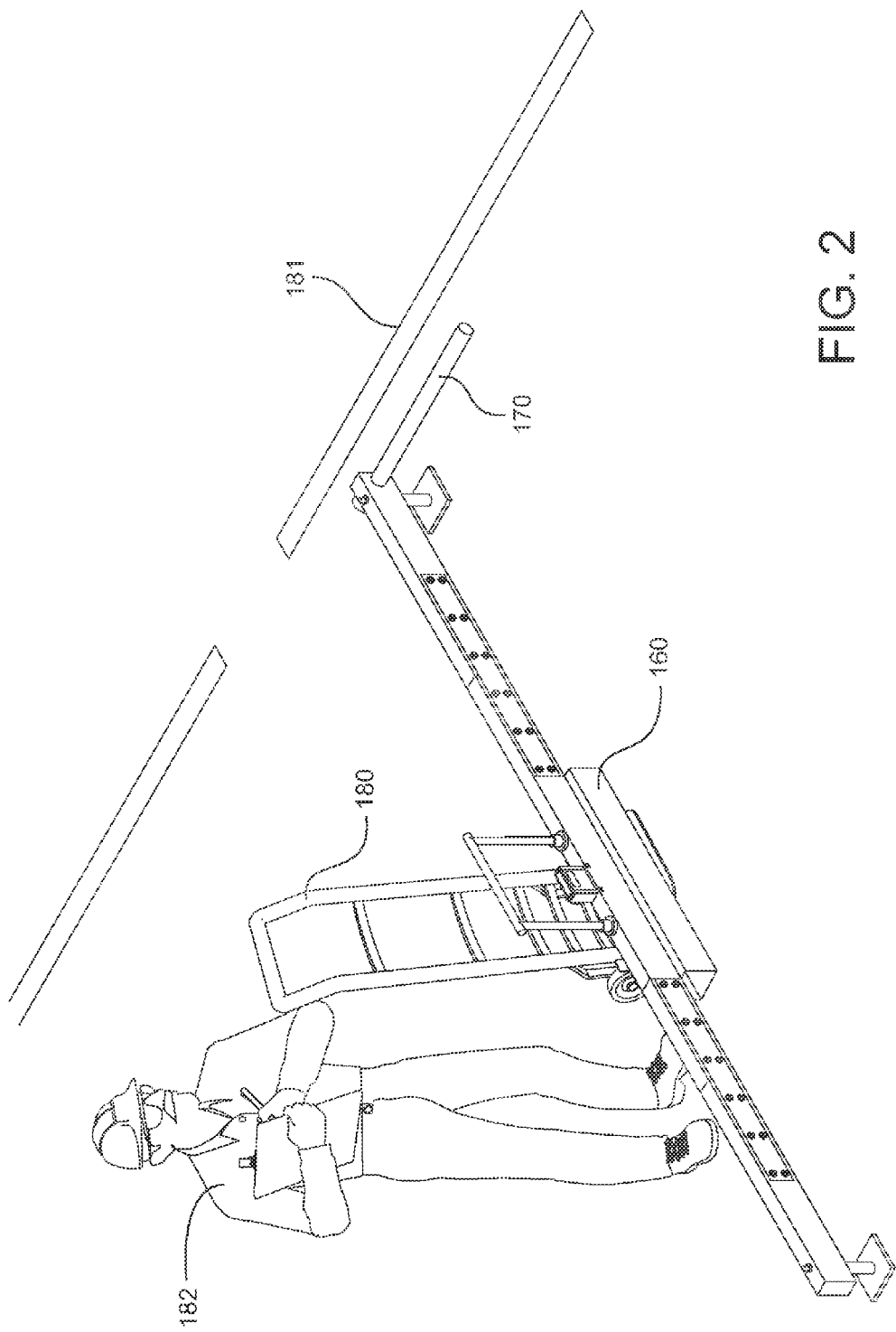
FIG. 2 is a perspective view showing the perpendicular alignment bar attached to the assembled device and highlighting how a human operator utilizes a hand truck to align and operate the device.
Figure 3:
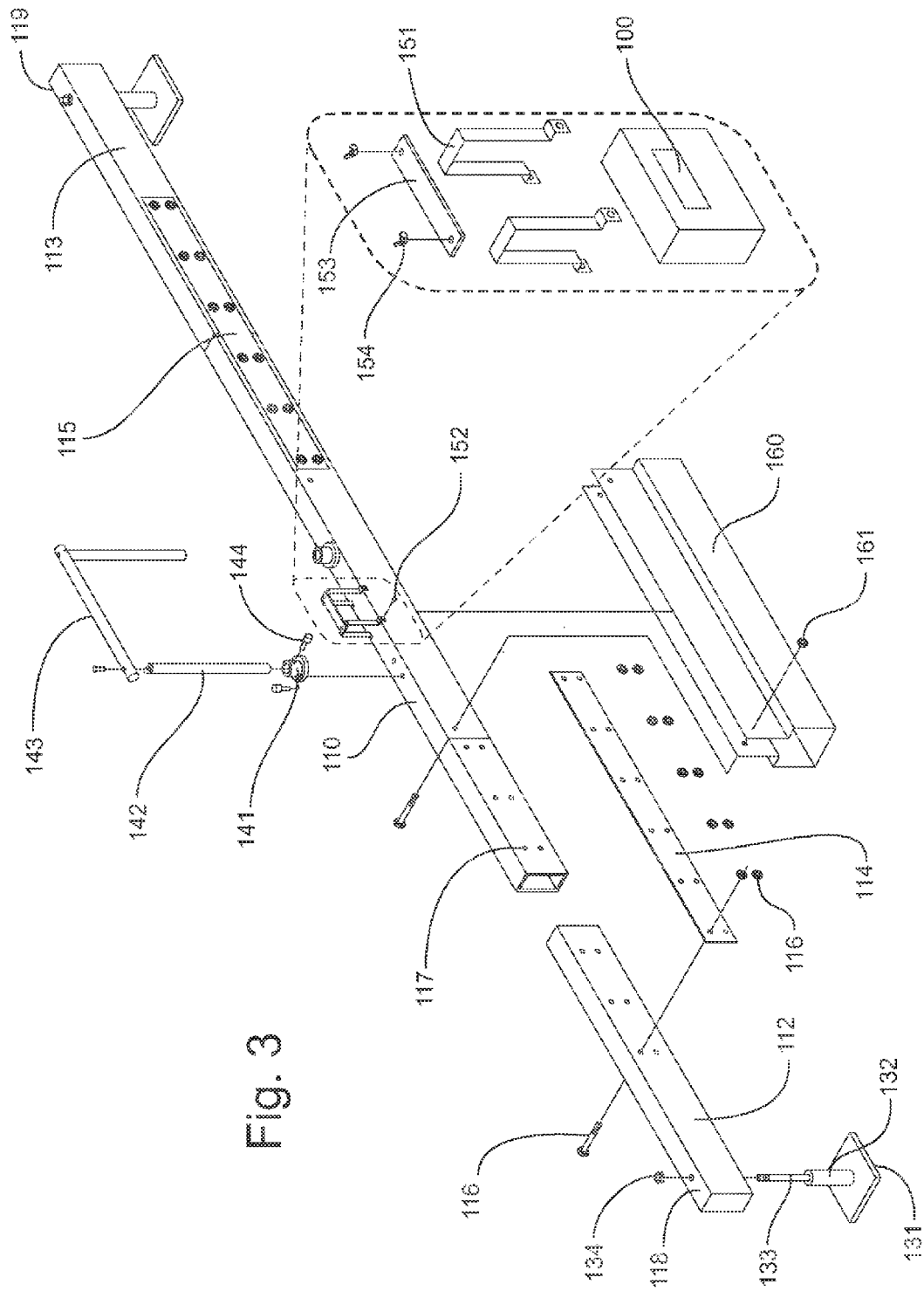
FIG. 3 is an exploded view of the device.

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

The present invention is a method and device for measuring the inclination of a roadway. Specifically, the invention is a device and method of using the device for measuring the inclination of a roadway that is perpendicular to the side of the road (181). The device encompasses a digital inclinometer (100) having an error of less than two arcminutes plus one digit and a frame for holding the inclinometer that is machined from magnesium and aluminum. The components of the frame are precisely machined to several thousandths of an inch.

The device comprises a latitudinal support arm (110), a pair of legs (130), a digital inclinometer (100) having an error of less than two arcminutes plus one digit, an inclinometer bracket (150) for holding the inclinometer, a handle (140), and a hand-truck attachment plate which is also referred to as a transportation bar (160). The entire device weighs less than fifty pounds.

The latitudinal support arm (110) is designed to span one lane of traffic. It is made of rectangular, hollow magnesium tubing that has been precisely machined to have level surfaces varying less than several thousandths of an inch from end to end. The use of hollow magnesium tubing is not a mere design choice; rather, it critically solves the problem of being able to machine the device to precise tolerances and, and at the same time, being able to maintain a light weight so that a single person can easily maneuver the device. The latitudinal support arm further comprises a center support arm (111) and both a left (112) and right (113) support arm. When both the left (112) and right (113) support arms are attached, the device spans a full lane of traffic. When only the center support arm (111) is used the device spans about four feet of a lane of traffic. In alternate embodiments, the latitudinal support arm is a single piece and does not separate into center, left, and right portions.

Each of the left (112) and right (113) support arms are respectively attached to the center support arm (111) via a plate and a plurality of nuts and bolts (116). That is, there is disclosed both a left (114) and a right (115) attachment plate. The left (112) and right (113) support arms each have a hole (respectively 118 and 119), machined perpendicular to the ground, disposed at one end for attachment of one of the pair of legs (130). At the end of the respective left (112) and right (113) support arms, on the end opposite the hole for the attachment of the legs, are a plurality of holes (117), machined parallel to the ground, through which the plurality of bolts (116) pass when the left (114) and right (115) attachment plates are utilized to attach the left (112) and right (113) support arms to the center support arm (111). The center support arm (111) also has a pair of holes (respectively 120 and 121), machined perpendicular to the ground, wherein one hole is disposed at each end for attachment of the pair of legs. The legs (130) are attached to the center support arm (111) only when the left and right support arms are not being utilized such as when only a small section of road needs to be tested as shown in FIG. 9.

The pair of legs (130) comprises a flat platform (131) for supporting the device, a vertical riser portion (132), for raising the device off of the roadway, and an outwardly threaded portion (133) which passes through the respective perpendicular holes disposed on the latitudinal support arms (118 and 119). An inwardly threaded nut (134) is also contemplated for securing the legs (130) to the latitudinal support arms (110).

The handle (140) removably attaches to the top side of the center support arm (111) of the latitudinal support arm (110). The handle further comprises a pair of attachment brackets (141), which are fixedly mounted on the center support arm (111), a pair of parallel elevation members (142), and a perpendicular member (143). The perpendicular member (143) is fixedly attached to the pair of parallel members (142) and it runs parallel to the center support arm (111). The pair of parallel members (142) removably attaches to the attachment brackets (141) via a set screw (144) configuration.

The inclinometer bracket (150) effectively attaches the digital inclinometer (100) to the center support arm (111) of the longitudinal support arm (110). However, alternate embodiments including allowing the digital inclinometer (100) and inclinometer bracket (150) to be mounted to either the left (112) or right (113) support arms for use when the underlying asphalt surface is too hot or soft to stand on and take an accurate measurement. The inclinometer bracket cradles the digital inclinometer and assures that the bottom surface of the digital inclinometer (100) is in complete and continuous contact with the top surface of the center support arm (111) of the longitudinal support arm (110). In the preferred embodiment, the inclinometer bracket (150) further comprises a pair of braces (151) which attach to the sides of the center support arm (111) of the longitudinal support arm (110) via screw means (152). These braces (151) also contact the sides of the digital inclinometer (110). The inclinometer bracket (150) further comprises a traverse plate member (153) that is attached to the pair of braces (151) via a threaded screw and nut configuration (154) such that the nuts can be tightened to secure the digital inclinometer (100) in place.

The digital inclinometer (100) is an inclinometer that can be purchased by the public. An example is the Wyler Clinotronic 45 Plus brand inclinometer. Wyler AG 2010 Catalog, [online], pages 56-59, [retrieved on 2011-03-29]. Retrieved from <URL: http://www.wylerag.com/pdf_katalog_2010/CLINO_PLUS_p56-59.pdf.

The digital inclinometer (100) must be accurate and highly precise. The digital inclinometer has a measuring range of ±45 degrees and has a setting time of approximately 2 seconds. The digital inclinometer (100) has an error of less than 2 arcmin+1 digit. It is powered by battery and has an operating temperature range of 0° to 40° C. The digital inclinometer (100) may also be connected directly to a computer.

Also attached to the center support arm (111) of the latitudinal support arm (110) is the transportation bar (160). The transportation bar (160) is removably attached to the center support arm (111) via screw means (161). The transportation bar (160) cradles the center support arm (111) and then extends a distance both below the lower surface of the center support arm (111) and a distance outward in a direction perpendicular to the center support arm (111). The transportation bar (160) allows the device to be moved from location to location for additional measurements of incline by a simple hand truck (180) operated by a single human operator (182). The transportation bar (160) is symmetrical so that the hand truck may be applied to either side of the device. The typical hand truck (180) is well known in the art and has two wheels, a flat lower portion for moving articles and a perpendicular leaver arm that pivots about the wheels to move an article. In the present case, the flat lower portion of the hand truck is inserted so as to extend below the lowest surface of the transportation bar which is should be just above the roadways surface. Thus, the width below the center support arm (111) that the transportation bar (160) extends will be slightly less than that of the pair of parallel legs (130).

Removably and optionally attached at each end of left and right support arms is a perpendicular alignment tool (170). The alignment tool (170) passes through a hole disposed on the respective end of either the right or the left support arm. This hole is opposite in direction from the hole through which the pair of legs pass. The alignment tool (170) is preferably constructed from plastic pipe with an endcap on one end. When the alignment tool is inserted, the endcap of the alignment tool (170) should touch the surface of the respective left (112) or right (113) support arm thus making the alignment tool (170) exactly perpendicular to the respective right (113) or left (112) support arm.

While the foregoing has been a description of one embodiment of the device, the following will be a description of one embodiment of the method of using the device to measure a roadway.

Figure 7:
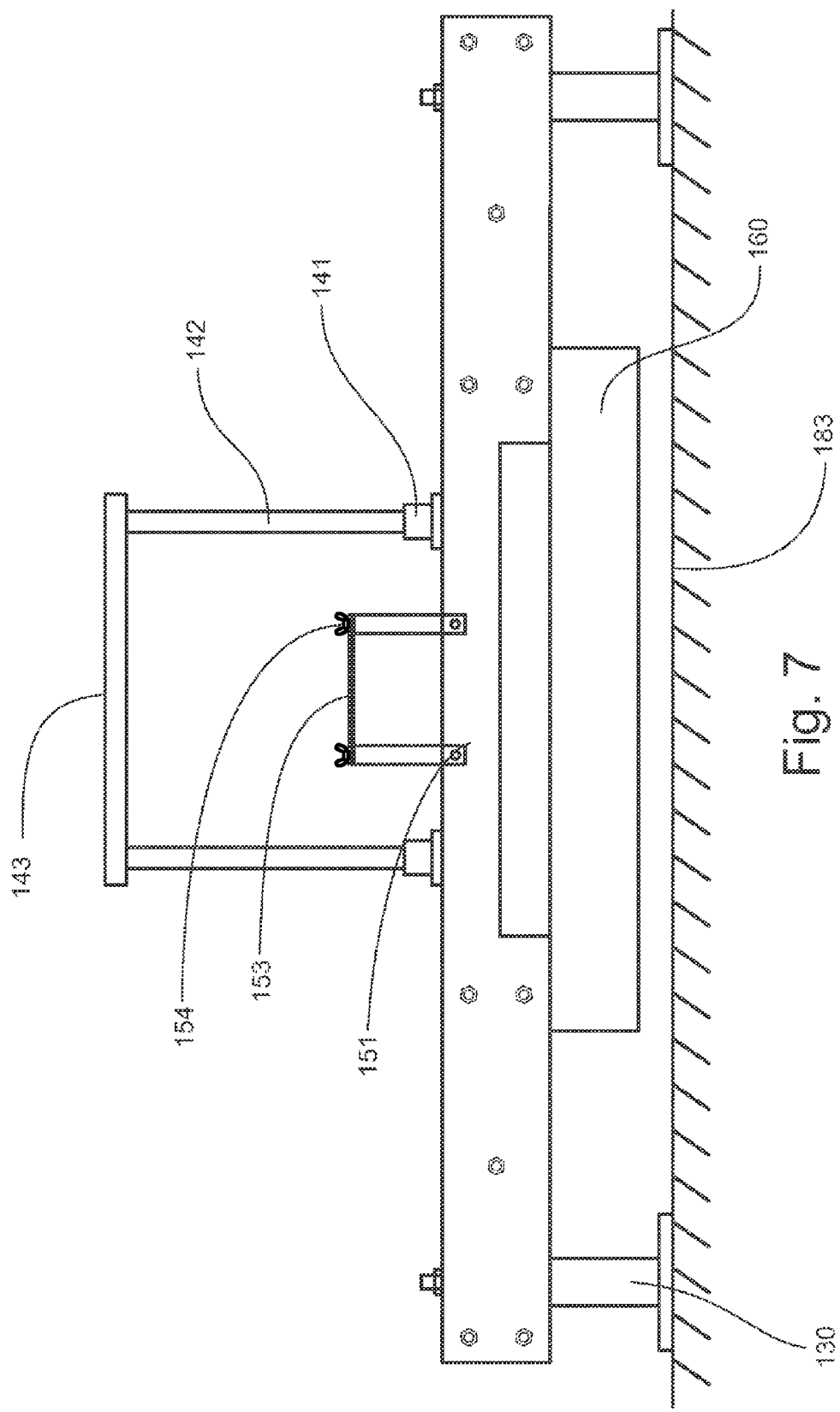
FIG. 7 is a front elevation view of the short version of the device.

First, providing a roadway (183). Second, providing a device for measuring the inclination of a roadway as described above. Next, the width of the roadway to be measured is determined. If the width of roadway is a full lane, then the left (112) and right (113) support arms are attached to the center support arm (FIG. 1). If the width is small, then the support arms are not attached (FIG. 7). Next the pair of legs (130) is attached at the respective ends of the latitudinal support arm (110). Next, the handle (140) and the transportation bar (160) are attached. Next, the digital inclinometer (100) and the inclinometer bracket (150) are attached. Next, the handtruck (180) is placed under the transportation bar (160). Next the alignment tool (170) is attached. Next, the entire device is maneuvered by a single human operator (182), and only a single human operator, to the desired location of roadway which will typically be between 50 and 100 feet behind the asphalt rollers and/or the pavement machines. The alignment tool (170) is used to align the device perpendicular to the side of the roadway (183). Next the digital inclinometer (100) is turned on by the single human operator (182) and the incline of the respective lane of the road is measured and recorded. The device is then repositioned to the next observation point, again, between 50 and 100 feet behind the asphalt rollers and/or pavement machines and another reading is obtained and recorded as described above, allowing the operator to provide timely and precise measurements that the paving machine operator can use to make adjustments to the inclination of his paving machine screed bar if necessary to keep the pavement cross slope within specified tolerances. When the final reading has been obtained, the device disassembled and stored by a single human operator (182).

In the event that that the heat being transferred from newly laid asphalt or other paving material may be too hot or too soft to walk on, an additional step is herein contemplated. Before the digital inclinometer and inclinometer bracket are attached to the center support arm, a temperature reading is first obtained. If the temperature reading does indeed show the surface is too hot to walk on, the digital inclinometer and the inclinometer bracket are then attached to either the left support arm or to the right support arm so that a reading might be obtained further from the center of the high temperatures. The attachment to the either the left or to the right support arm is identical to the process used to attach the inclinometer and inclinometer bracket to the center support arm.

What is claimed is:

1. A device for measuring the inclination of a roadway comprising: a latitudinal support arm being constructed from hollow magnesium tubing and being machined to a length long enough to span a lane of vehicular traffic, a single, and only a single, pair of legs removably attached to said latitudinal support arm, a digital inclinometer having an error of less than two arcminutes plus one digit, an inclinometer bracket removably attached to said latitudinal support arm and to said digital inclinometer for securing said inclinometer to said latitudinal support arm, a handle removably attached to said latitudinal support arm, and a transportation bar removably attached to said latitudinal support arm.

2. The device for measuring the inclination of a roadway of claim 1 wherein each one of said pair of legs further comprises a platform portion for supporting the device on a roadway surface, a vertical riser portion for raising the device off of the roadway, and an outwardly threaded portion disposed at one end and an inwardly threaded nut.

3. The device for measuring the inclination of a roadway of claim 2 wherein the latitudinal support arm further comprises a center support arm having a plurality of holes machined at each end running parallel to level ground and a single left hole and a single right hole located at the respective ends running perpendicular to level ground.

4. The device for measuring the inclination of a roadway of claim 3 wherein the outwardly threaded portion of one of said pair of legs passes through the single left hole of the center support arm and is secured in place by one of said inwardly threaded nuts and wherein the outwardly threaded portion of the other of said pair of legs passes through the single right hole of the center support arm and is secured in place by the other of said inwardly threaded nuts.

5. The device for measuring the inclination of a roadway of claim 3 wherein the latitudinal support arm further comprises: a left support arm having a plurality of holes machined at one end running parallel to level ground and a single hole machined at the opposite end from said plurality of holes and running perpendicular to level ground, a right support arm having a plurality of holes machined at one end running parallel to level ground and a single hole machined at the opposite end from said plurality of holes and running perpendicular to level ground, a left attachment plate having a plurality of holes machined to align with the plurality of holes of said left support arm and with the plurality of holes at the left end of said center support arm, a right attachment plate having a plurality of holes machined to align with the plurality of holes of said right support arm and with the plurality of holes at the right end of said center support arm, and a plurality of bolts and a plurality of nuts, said plurality of bolts being inserted through the plurality of holes of the left attachment plate and the left support arm, the left attachment plate and the center support arm, the right attachment plate and the right support arm, and the right attachment plate and the center support arm, said plurality of nuts being secured to the end of said plurality of bolts such that left support arm is attached to the center support arm and the right support arm is attached to the center support arm via a nut-bolt-plate attachment means.

6. The device for measuring the inclination of a roadway of claim 5 wherein the outwardly threaded portion of one of said pair of legs passes through said single hole of said left support arm and is secured in place by one of said inwardly threaded nuts and wherein the outwardly threaded portion of the other of said pair of legs passes through said single hole of said left support arm and is secured in place by the other of said inwardly threaded nuts.

7. The device for measuring the inclination of a roadway of claim 6 wherein said handle further comprises a pair of attachment brackets fixedly mounted to said center support arm, a pair of parallel elevation members removably attached to said pair of attachment brackets via a set screw means, and a perpendicular member fixedly attached to the pair of parallel elevation members running parallel to said center support arm.

8. The device for measuring the inclination of a roadway of claim 7 wherein said transportation bar is symmetrical, is attached to the center support arm of the latitudinal support arm via screw means, and extends a distance both below the lower surface of the center support arm and a distance outward in a direction perpendicular to the center support arm.

9. The device for measuring the inclination of a roadway of claim 8 wherein said inclinometer bracket tightly and removably attaches to the digital inclinometer and further comprises a pair of braces and a traverse plate member, said traverse plate member attaching to said pair of braces via a threaded screw and nut means such that the nuts can be tightened to secure the digital inclinometer in place.

10. The device for measuring the inclination of a roadway of claim 9 wherein said pair of braces removably attaches to said center support arm via screw means.

11. The device for measuring the inclination of a roadway of claim 9 wherein said pair of braces removably attaches to said left support arm via screw means.

12. The device for measuring the inclination of a roadway of claim 9 wherein said pair of braces removably attaches to said right support arm via screw means.

13. The device for measuring the inclination of a roadway of claim 10 wherein said left support arm and said right support arm each comprise an alignment hole at the end furthest from the center support arm and wherein said device for measuring the inclination of a roadway further comprises an alignment tool which attaches to either the left or to the right support arm via said alignment hole, said alignment tool comprising a length of plastic pipe having a diameter smaller than a diameter of said alignment hole of said left support arm and said right support arm and an end cap having a diameter larger than the diameter of said alignment hole of said left support arm and said right support arm.

14. A device for measuring the inclination of a roadway comprising:
- a latitudinal support arm being constructed from a single piece of hollow magnesium tubing, being machined to a length long enough to span a ten foot lane of vehicular traffic, having a single left hole machined perpendicular to the ground at a left end of said latitudinal support arm, and having a single right hole machined perpendicular to the ground at a right end of said latitudinal support arm,
- a left leg comprising a platform portion for supporting the device on a roadway surface, a vertical riser portion for raising the device off of the roadway, and an outwardly threaded portion disposed at one end and an inwardly threaded nut, said outwardly threaded portion passing through the single left hole of the latitudinal support arm and being secured by said inwardly threaded nut,
- a right leg comprising a platform portion for supporting the device on a roadway surface, a vertical riser portion for raising the device off of the roadway, and an outwardly threaded portion disposed at one end and an inwardly threaded nut, said outwardly threaded portion passing through the single right hole of the latitudinal support arm and being secured by said inwardly threaded nut,
- a digital inclinometer having an error of less than two arcminutes plus one digit,
- an inclinometer bracket removably attached to said latitudinal support arm via screw means and to said digital inclinometer for securing said inclinometer to said latitudinal support arm,
- a handle removably attached to said latitudinal support arm, and
- a symmetrical transportation bar removably attached to said latitudinal support arm via screw means, said symmetrical transportation bar extending a distance below the lower surface of the latitudinal support arm so as to be just off of the surface of the roadway and said symmetrical transportation bar also extending a distance outward in a direction perpendicular to said latitudinal support arm.

15. A method of measuring the inclination of a roadway comprising the steps of:
- a. providing a roadway to be measured;
- b. providing a device for measuring the inclination of the roadway, said device weighing less than fifty pounds, being capable of measuring the inclination of a roadway to a degree of precision of less than two arcminutes plus one digit, and comprising a left support arm, a center support arm, and a right support arm, each of said support arms being constructed from hollow magnesium, a pair of legs, a digital inclinometer having an error of less than two arcminutes plus one digit, an inclinometer bracket, a handle, a transportation bar, and an alignment tool;
- c. determining a width of the roadway to be measured, proceeding to step g if the measured width is less than eight feet;
- d. attaching the left support arm and the right support arm to the center support;
- e. attaching one leg of the pair of legs to the left support arm and attaching the other leg of the pair of legs to the right support arm;
- f. attaching the alignment tool, skipping step g;
- g. attaching the pair of legs to the center support arm;
- h. attaching the handle and the transportation bar to the center support arm;
- i. attaching the digital inclinometer and inclinometer bracket to the center support arm;
- j. providing a handtruck equipment mover;
- k. placing the handtruck under the transportation bar;
- l. providing a single human operator;
- m. maneuvering the handtruck with the assembled device for measuring the inclination of the roadway by the single human operator to the first desired section of roadway for a first inclination measurement;
- n. aligning the alignment tool, if previously attached in step f, to be parallel with the side of the roadway to be measured;
- o. turning on the digital inclinometer by the single human operator;
- p. measuring the incline of the respective lane of the roadway;
- q. recording the incline of the respective lane of the roadway;
- r. repositioning the device to the next desired section of roadway for another inclination measurement;
- s. repeating steps m through r until all sections of the roadway have been measured;
- t. dissembling the device for measuring the inclination of the roadway.

16. The method of measuring the inclination of a roadway of claim 15 wherein step i is replaced with the steps of:
- i. measuring the temperature of the roadway, attaching the digital inclinometer and inclinometer bracket to either the left support arm or to the right support arm if both the temperature is too hot to walk on and the left support arm and the right support arm were attached previously in step d.

* * * * *